(12) United States Patent
Emad et al.

(10) Patent No.: US 6,467,508 B1
(45) Date of Patent: Oct. 22, 2002

(54) LOW PRECIPITATE POLYAMIDE BASED TUBING

(75) Inventors: Mehdi M. Emad, Collegeville, PA (US); Gregory S. O'Brien, Downington, PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 0 days.

(21) Appl. No.: 09/976,807

(22) Filed: Oct. 12, 2001

(51) Int. Cl.⁷ .............................. F16L 11/04; F16L 9/14
(52) U.S. Cl. ................... 138/137; 138/140; 138/141; 138/DIG. 7; 428/36.7; 428/36.91
(58) Field of Search ................... 138/137, 141, 138/177, DIG. 7, 140; 428/36.91, 36.9, 36.92, 36.7

(56) References Cited

U.S. PATENT DOCUMENTS

| | | | |
|---|---|---|---|
| 5,242,976 A | 9/1993 | Strassel et al. | 525/72 |
| 5,419,374 A | 5/1995 | Nawrot et al. | 138/137 |
| 5,510,160 A | 4/1996 | Jadamus et al. | 428/36.9 |
| 5,554,426 A | 9/1996 | Rober et al. | 428/36.9 |
| 5,570,711 A * | 11/1996 | Walsh | 138/125 |
| 5,996,642 A | 12/1999 | Noone et al. | 138/137 |
| 6,040,025 A | 3/2000 | Lorek | 428/35.9 |
| 6,041,826 A * | 3/2000 | Lorek et al. | 138/137 |
| 6,143,415 A | 11/2000 | Lorek et al. | 428/421 |
| 6,177,162 B1 * | 1/2001 | Siour et al. | 138/137 |

* cited by examiner

*Primary Examiner*—Patrick Brinson
(74) *Attorney, Agent, or Firm*—William D. Mitchell

(57) ABSTRACT

Low precipitate polyamide tubing useful to transport fluids such as automotive fuel.

11 Claims, No Drawings

LOW PRECIPITATE POLYAMIDE BASED TUBING

BACKGROUND OF THE INVENTION

The present invention relates to compositions of matter classified in the art of chemistry as polyamides, particularly polyamides 11 and 12, articles of manufacture useful in the art of the transport of fluids such as solvents, polar fluids and fuels for applications such as fuel hoses or tubing for internal combustion engines, particularly engines for use in self-propelled vehicles as well as processes for said articles of manufacture and of said compositions of matter.

Flexible hoses for fuel systems and fuel vapor pollution control for internal combustion engines are well known. Such hoses have been fabricated from single layers (single wall hoses) of polyamide and other synthetic polymers and in the past have proven satisfactory in such use for automobiles and other vehicles as well as in internal combustion engines for stationary use. These single wall hoses, which may have lengths as great as several meters, must, once installed, not materially charge or rupture during their service life due to shrinkage, elongation in response to heat or cold or any other stresses applied during use.

Recently changing, more rigorous, environmental regulations have required that these fuel supply hoses, particularly for automotive vehicles, be relatively impervious to fuel vapors and, because of polar ingredients such as oxygenates required to be formulated in the fuel, that the material in the hose in contact with the fuel be resistant to extraction of materials from the hose which precipitate into the fuel or have the potential to clog fuel filters, fuel injectors and the like which have extremely small orifices and, thus, low tolerance for particulates in the fuel.

One solution to the permeation problem has been to coextrude multilayer (multiwall) tubing or hoses having at least one layer (often referred to as a "barrier layer") which is not permeable to hydrocarbon vapors or other volatile components of the fuel.

In order to avoid the problems associated with precipitates related to extraction of components from polyamides, the use of polyamide monolayer tubing or multilayer tubing having a polyamide inner layer has been preferably avoided in the design of such hoses.

Typical of such multilayer constructions are those described in U.S. Pat. Nos. 5,419,374; 5,996,642; 5,510,160; and 5,554,426, as well as the references cited in those patents. The reasons why polyamides in contact with the fuel are undesirable are explained in detail in U.S. Pat. No. 5,996,642 particularly. In the constructions in these patents, the mechanical properties of polyamide are coupled with the permeability barrier properties of various fluoropolymers which by themselves would either be too expensive for use in automotive production or lack one or more of the mechanical properties of polyamides which otherwise make polyamide 12 or 11 the preferred polymers for fuel hose manufacture. Since polyamides and many fluoropolymers do not adhere well together without either mechanical interlinkage or a tie layer between them, the above cited references also address a number of solutions to this problem, such as use of a tie layer or use of an acrylic-modified fluoropolymer barrier layer.

As used herein, the term "low precipitate polyamide" means that the polyamide has been washed or extracted to reduce the level of components such as oligomers (low molecular weight polyamide), solids or semi-solids which would otherwise be released by the polyamide after exposure to the transported fluid and/or precipitate into the fluid.

SUMMARY OF THE INVENTION

The invention provides in a composition aspect, improved tubing (or hose) for fluid transport comprised of low precipitate polyamide (preferably polyamide 12 or 11), both in the form of monolayer tubing (preferably for conveying fuel) and as multilayer tubing comprised of at least an inner polyamide layer in contact with the fluid and a barrier layer (preferably a fluoropolymer such as a polyvinylidene fluoride, unmodified or modified to improve adhesion using materials such as a polyglutarimide or an acrylate copolymer). The barrier layer may be bonded to the polyamide layer via a tie layer (for example, as taught in U.S. Pat. No. 5,242,976), via adhesive bonding (as taught, for example, in U.S. Pat. Nos. 5,419,374 and 5,510,160) or via use of an acrylic-modified barrier layer which adheres itself to the polyamide (as taught, for example, in U.S. Pat. No. 5,554,426). One preferred construction for use in a motor vehicle fuel comprises at least an inner polyamide layer in contact with the fuel, an intermediate tie layer bonded to the outer surface of the inner layer and a layer of a polyvinylidene fluoride bonded to the outer surface of the intermediate tie layer, the improvement comprising using low precipitate polyamide as the inner layer. Other preferred constructions for such use include multilayer tubing comprised of an inner layer of low precipitate polyamide, an intermediate layer of modified polyvinylidene fluoride, and an outer layer of polyamide, as well as multilayer tubing comprised of a first, inner layer of low precipitate polyamide which is conductive in order to discharge static electricity, a second, polyamide layer, a third, modified polyvinylidene fluoride layer, and a fourth, outer layer of polyamide.

The tangible embodiments of the improved composition aspect of the invention possess the inherent applied use characteristics of being suitable for the transport of fluids such as hydrocarbon based fuel, and vapors thereof, for internal combustion engines, particularly automotive use and those hydrocarbon fuels containing oxygenated additives, such as alcohols or ethers in particular, while not adding contaminants to said fuels which would have a tendency to obstruct passage of said fuel through fuel filters, fuel pumps, carburetor jets or fuel injection jets and the like.

Special mention is made of embodiments of the composition aspect of the invention wherein the innermost layer does not contain electrostatic discharge capacity, as well as embodiments wherein the innermost layer includes electrostatic discharge capability; embodiments having corrugations perpendicular, parallel to, or at an angle to the longitudinal axis of the hose (such as taught in U.S. Pat. No. 5,996,642); embodiments having one or more additional layers adhered to the outer surface of the outer surface of the barrier layer; and of embodiments wherein when the innermost layer in contact with the fluid has electrostatic discharge capability, said electrostatic discharge capability is distributed non-uniformly throughout said innermost layer, preferably with at least the greater portion of the electrostatic discharge capability being concentrated in the vicinity of the innermost face of said innermost layer which face is in direct contact with the fluid.

DETAILED DESCRIPTION

Methanol has been found to be especially useful for preparing the low precipitate polyamide (preferably polyamide 11 or 12). The actual techniques of washing the polyamide with methanol are not particularly critical as the polymer simply needs to be washed using any convenient technique and equipment such that the wash shows a substantial reduction in extractable components. If desired, solvents with similar solubility capability for polyamide oligomers may be substituted for methanol. The washing can be performed at any stage of preparation of the hose/tubing. That is, the fresh resin as received from the synthesis may be washed, the resin compounded with suitable plasticizers, such as N-n-butyl benzene sulfonamide, and any other desired additives may be washed, or after preparation of a complete multilayer hose, the interior polyamide resin layer can be washed.

For the multilayer constructions, other materials useful for the barrier layer include other fluoropolymers such as PTFE (polytetrafluoroethylene), ETFE (polyethylenetetrafluoroethylene), FEP (fluorinated ethylene propylene), CTFE (polychlorotrifluoroethylene) and ECTFE (polyethylenechlorotetrafluoroethylene), as well as LCP (liquid crystal polymers), and EVOH (ethyl vinyl alcohol). All of these polymers, as well as the aforementioned polyvinylidene fluoride polymers, are available from a number of manufacturers worldwide.

Techniques for coextrusion and bonding of the multilayer constructions are well known in the art are not critical to the practice of the invention, are documented in the aforementioned references and will not be discussed in great detail herein.

The use of a multilayer construction minimizes permeation and permits use of a thin inner polyamide layer, thus minimizing cost and the volume of material that can be extracted by the transported fluid. For fuel line applications, a polyamide monowall might typically have a thickness of 0.05 to 0.125 inch, while in the case of multilayer construction, the polyamide inner wall is more typically 0.005 to 0.06 inch thick.

Polyamide 11 is the polymer produced by polycondensation of 11-aminoundecanoic acid. It is available commercially under the RILSAN registered trademark from ATOFINA Chemicals, Inc. in the U.S. and its related companies worldwide. Polyamide 12 is the polymer prepared by polycondensation of the lactam of 12-aminododecanoic acid and is available commercially worldwide from a number of sources.

In constructions using tie layers, the preferred material is Adheflon ASP720 available from ATOFINA Chemicals, Inc. in the United States and its affiliated companies worldwide. Adheflon ASP720 is a mixture of polyvinylidene fluoride compounded with various additives which add adhesion to polyamides 11 and 12. U.S. Pat. Nos. 5,242,976, 6,040,025 and 6,143,415 teach how to make suitable materials of this type which are useful in formulating multilayer hoses contemplated by this invention.

As stated above, the multilayer or multiwall tubes may be prepared by standard methods, for example, a tube similar to the one described in U.S. Pat. No. 5,419,374 may be prepared except reversing the positioning of the polyvinylidene fluoride inner and outer layers and substituting methanol washed polyamide 11 or 12 resin of a similar grade for the polyamide resin grade described in that patent.

One skilled in the art will, of course, recognize that additional layers may be adhered outside of the barrier layer in all of the multilayer constructions with appropriate adhesion layers if the additional layers are not inherently adherent to polyvinylidene fluoride or to each other, and that such hoses or tubes having such additional outer layers are contemplated as full equivalents by the invention. Also contemplated as full equivalents by the invention are tubing constructions where the low precipitate polyamide layer in contact with the fuel is conductive to discharge static electricity buildup throughout its entire thickness, has a separate conductive layer of washed polyamide adhered to its inner surface or has a gradient concentration of carbon or other static discharge capable material incorporated when viewed in cross section.

An example of the effect of methanol washing on precipitate levels was illustrated by washing polyamide 11 with methanol, resulting in a reduction in weight percent extractable content from 1.72% in the unwashed material to 0.66% in the washed material. In a second example, tests run in fuel on methanol washed-polyamide 11 showed that no apparent fuel insoluble precipitates were extracted.

The subject matter regarded as their invention by the inventors is particularly pointed out and distinctly claimed as follows:

1. Improved multilayer tubing useful for fluid transport comprising at least an inner polyamide layer in contact with the fluid and a barrier layer, the improvement comprising using low precipitate polyamide as the inner layer.

2. The tubing of claim 1 wherein a tie layer connects the inner polyamide layer to a barrier layer.

3. The tubing of claim 1 wherein the barrier layer is a fluoropolymer.

4. The tubing of claim 3 wherein the fluoropolymer is polyvinylidene fluoride.

5. The tubing of claim 4 wherein the polyvinylidene fluoride has been modified to improve adhesion.

6. The tubing of claim 1 wherein there is (A) at least one polyamide layer and (B) at least one layer adjacent to said layer (A) comprising a mixture of a polyvinylidene fluoride and a polyglutarimide, and wherein the layers (A) and (B) are adhesively bonded to one another.

7. The tubing of claim 1 having at least (A) a polyamide layer and (B) a layer adjacent to said layer (A) containing a mixture of polyvinylidene fluoride and an acrylate copolymer, with the layers adhering to one another.

8. An improved layered tubing useful in a motor vehicle for conveying fuel comprising at least an inner polyamide layer in contact with the fuel, an intermediate tie layer bonded to the outer surface of the inner layer and a layer of polyvinylidene fluoride bonded to the outer surface of the tie layer, the improvement comprising using low precipitate polyamide as the inner layer.

9. The tubing of claim 8 wherein the inner polyamide layer comprises polyamide 12 or polyamide 11.

10. Monolayer tubing useful for conveying fuel which comprises a low precipitate polyamide.

11. The tubing of claim 10 wherein the polyamide is selected from polyamide 12 or polyamide 11.

* * * * *